(12) United States Patent
Murakami et al.

(10) Patent No.: US 9,236,680 B2
(45) Date of Patent: Jan. 12, 2016

(54) CONNECTOR AND VEHICLE INCLUDING CONNECTOR

(75) Inventors: Akinobu Murakami, Miyoshi (JP); SangGyu Kim, Nagoya (JP); Jun Ishii, Okazaki (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 822 days.

(21) Appl. No.: 13/576,596

(22) PCT Filed: Feb. 11, 2011

(86) PCT No.: PCT/IB2011/000254
§ 371 (c)(1),
(2), (4) Date: Nov. 1, 2012

(87) PCT Pub. No.: WO2011/098900
PCT Pub. Date: Aug. 18, 2011

(65) Prior Publication Data
US 2013/0045633 A1 Feb. 21, 2013

(30) Foreign Application Priority Data
Feb. 12, 2010 (JP) .................. 2010-028816

(51) Int. Cl.
*H01R 13/447* (2006.01)
*H01R 13/453* (2006.01)
(Continued)

(52) U.S. Cl.
CPC ........ *H01R 13/4538* (2013.01); *B60L 11/1818* (2013.01); *H01R 13/447* (2013.01); *H01R 13/707* (2013.01); *H01R 13/713* (2013.01); *H01R 2201/26* (2013.01);
(Continued)

(58) Field of Classification Search
CPC .................. Y10S 439/911; H01R 13/4538
See application file for complete search history.

(56) References Cited

U.S. PATENT DOCUMENTS 5,344,330 A * 9/1994 Hoffman ............. B60L 11/1818
439/138
5,348,491 A 9/1994 Louwagie et al.
(Continued)

FOREIGN PATENT DOCUMENTS

EP 0 660 450 A2 6/1995
JP A-2004-112902 4/2004
(Continued)

OTHER PUBLICATIONS

International Search Report issued in International Patent Application No. PCT/IB2011/000254 dated May 25, 2011.
(Continued)

*Primary Examiner* — James Harvey
(74) *Attorney, Agent, or Firm* — Oliff PLC

(57) ABSTRACT

A connector includes: a first connector terminal to which a first electric cable is to be connected; a second connector terminal to which a second electric cable is to be connected; a sidewall that surrounds the first connector terminal and the second connector terminal; a protection cover; and an interlock mechanism. The interlock mechanism includes an interlock connector and an interlock pin. The interlock connector is disposed between the first connector terminal and the second connector terminal, and the interlock pin is provided at the protection cover and is positioned such that the interlock pin is inserted into the interlock connector when the protection cover is attached to the sidewall.

5 Claims, 4 Drawing Sheets

(51) Int. Cl.
  *H01R 13/707* (2006.01)
  *H01R 13/713* (2006.01)
  *B60L 11/18* (2006.01)

(52) U.S. Cl.
  CPC ............ *Y02T 10/7005* (2013.01); *Y02T 90/14* (2013.01); *Y10S 439/911* (2013.01)

(56) References Cited

U.S. PATENT DOCUMENTS

| | | | | |
|---|---|---|---|---|
| 5,385,480 | A | * | 1/1995 | Hoffman ............. B60L 11/1818 439/138 |
| 5,562,490 | A | * | 10/1996 | Rybolt ................... B60R 16/02 439/332 |
| 5,584,715 | A | * | 12/1996 | Ehrenfels ........... B60L 11/1818 439/222 |
| 5,816,850 | A | | 10/1998 | Yamada et al. |
| 5,934,918 | A | * | 8/1999 | Wuechner .......... B60L 11/1818 439/133 |
| 6,261,123 | B1 | * | 7/2001 | Kruger .................. H01R 13/60 439/484 |
| 7,207,812 | B1 | * | 4/2007 | Wong ................. H01R 13/4534 439/136 |
| 7,244,148 | B2 | * | 7/2007 | Maguire ............... B60L 3/0069 439/620.28 |
| 2004/0192095 | A1 | * | 9/2004 | Joist ..................... H05K 7/1409 439/188 |
| 2006/0125434 | A1 | * | 6/2006 | Frohne ................. H02J 7/1438 318/139 |
| 2007/0173133 | A1 | * | 7/2007 | Carlson ............. H01R 13/6335 439/709 |
| 2013/0045633 | A1 | * | 2/2013 | Murakami .......... H01R 13/447 439/626 |

FOREIGN PATENT DOCUMENTS

| | | |
|---|---|---|
| JP | A-2005-143200 | 6/2005 |
| JP | A-2008-535153 | 8/2008 |
| JP | A-2009-219284 | 9/2009 |
| WO | WO 2006/100045 A1 | 9/2006 |

OTHER PUBLICATIONS

Written Opinion of the International Searching Authority issued in International Patent Application No. PCT/IB2011/000254 dated May 25, 2011.

* cited by examiner

CONNECTOR AND VEHICLE INCLUDING CONNECTOR

BACKGROUND OF THE INVENTION

1. Field of the Invention

The invention relates to a connector including an interlock mechanism that is used in a high-voltage unit to secure the safety in maintenance and inspection of the high voltage unit, and a vehicle including the connector or a plurality of the connectors.

2. Description of the Related Art

For example, in hybrid vehicle structures and electric motor vehicle structures, a breaker device and a high-voltage unit are placed in a space isolated from the occupant compartment and luggage compartment of the vehicle, and the space is closed by covering it with a lid for maintenance. For maintenance and inspection of a high-voltage unit, an appropriate safety measure or measures must be taken to ensure that a person who performs maintenance and inspection of the high voltage unit (will be referred to as "worker" where necessary) is sufficiently protected from high voltages.

Japanese Patent Application Publications No. 2005-143200 (JP-A-2005-143200) and No. 2004-112902 (JP-A-2004-112902) each describe a connector for which an interlock mechanism is provided. The interlock mechanism interrupts, for protection from high voltages, a corresponding circuit when a protection cover is detached. FIG. 5 shows an example of a set of connectors for which an interlock mechanism is provided. Referring to FIG. 5, connectors are provided on a side face of a high-voltage unit case 1600 in which an inverter circuit is disposed. The inverter circuit is connected to, for example, a front motor generator, a rear motor generator, and a starter generator, which are examples of "electric rotational devices", via respective three-phase power cables.

More specifically, the front motor generator is connected to a first connector 1510 via a three-phase power cable, and the first connector 1510 includes a U-phase terminal 1510U, a V-phase terminal 1510V, and a W-phase terminal 1510W. The rear motor generator is connected to a second connector 1520 via a three-phase power cable, and the second connector 1520 includes a U-phase terminal 1520U, a V-phase terminal 1520V, and a W-phase terminal 1520W. The starter generator is connected to a third connector 1530 via a three-phase power cable, and the third connector 1530 includes a U-phase terminal 1530U, a V-phase terminal 1530V, and a W-phase terminal 1530W.

The first connector 1510, the second connector 1520, and the third connector 1530 are surrounded by a single sidewall 1550. A protection cover 1560 is attached to the sidewall 1550 so as to cover the first connector 1510, the second connector 1520, and the third connector 1530. The protection cover 1560 is detachable from the sidewall 1550.

Further, an interlock mechanism is provided. The interlock mechanism interrupts currents flowing to the first connector 1510, the second connector 1520, and the third connector 1530, when the protection cover 1560 is detached from the side face of the high-voltage unit case 1600. An interlock connector 1541 is provided near the first connector 1510, and an interlock pin (not shown) is provided at the protection cover 1560. The currents are allowed to flow by inserting the interlock pin into the interlock connector 1541.

In the connectors with the above-described configuration, the currents flowing to the connectors are interrupted by detaching the protection cover 1560 to remove the interlock pin from the interlock connector 1541. Thus, workers are protected from high voltages.

In the structure described above, however, the three connectors are surrounded by the common sidewall 1550, and therefore, there are various design restrictions, which make it difficult to reduce the size of the high-voltage unit case. On the other hand, for the purpose of increasing the design flexibility, a sidewall and an interlock mechanism may be provided at each connector. However, if the interlock mechanism is simply provided at each connector, the connector size is increased by the region in which the interlock mechanism is provided.

SUMMARY OF THE INVENTION

The invention provides a connector that includes an interlock mechanism but is compact in size, and a vehicle including the connector or a plurality of the connectors.

The first aspect of the invention relates to a connector. The connector includes a first connector terminal to which a first electric cable is to be connected; a second connector terminal to which a second electric cable is to be connected, and which is disposed so as to be spaced apart from the first connector terminal; a sidewall that surrounds the first connector terminal and the second connector terminal; a protection cover that is attached to the sidewall so as to cover the first connector terminal and the second connector terminal, and is detachable from the sidewall; and an interlock mechanism that interrupts currents flowing to the first connector terminal and the second connector terminal, when the protection cover is detached from the sidewall.

The interlock mechanism includes an interlock connector and an interlock pin, and the currents are allowed to flow to the first connector terminal and the second connector terminal, by inserting the interlock pin into the interlock connector.

The interlock connector is disposed between the first connector terminal and the second connector terminal, and the interlock pin is provided at the protection cover and is positioned such that the interlock pin is inserted into the interlock connector when the protection cover is attached to the sidewall.

The connector according to the first aspect of the invention may further include a third connecter terminal which is disposed so as to be spaced apart from the second connector terminal, and to which a third electric cable is to be connected. A current sensor may be connected to the second connecter terminal and the third connector terminal, and a first predetermined interval between the first connector terminal and the second connector terminal may be larger than a second predetermined interval between the second connector terminal and the third connector terminal.

In the first aspect of the invention, the connector may connect an inverter unit and an electric rotational device with each other; and the first connector terminal may be a U-phase terminal, the second connector terminal may be a V-phase terminal, and the third connector terminal may be a W-phase terminal.

In the first aspect of the invention, a plurality of the connectors may be disposed so as to be spaced apart from each other.

A second aspect of the invention relates to a vehicle. The vehicle includes an inverter unit; an electric rotational device; and the connector according to the first aspect of the invention. The connector connects the inverter unit and the electric rotational device with each other.

A third aspect of the invention relates to a vehicle. The vehicle includes an inverter unit; a plurality of electric rotational devices; and a plurality of the connectors according to the first aspect of the invention. Each of the connectors connects a corresponding one of the electric rotational devices and the inverter unit with each other.

According to the above-described aspects of the invention, it is possible to provide a connector that includes an interlock mechanism but is compact in size, and a vehicle including the connector or a plurality of the connectors.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
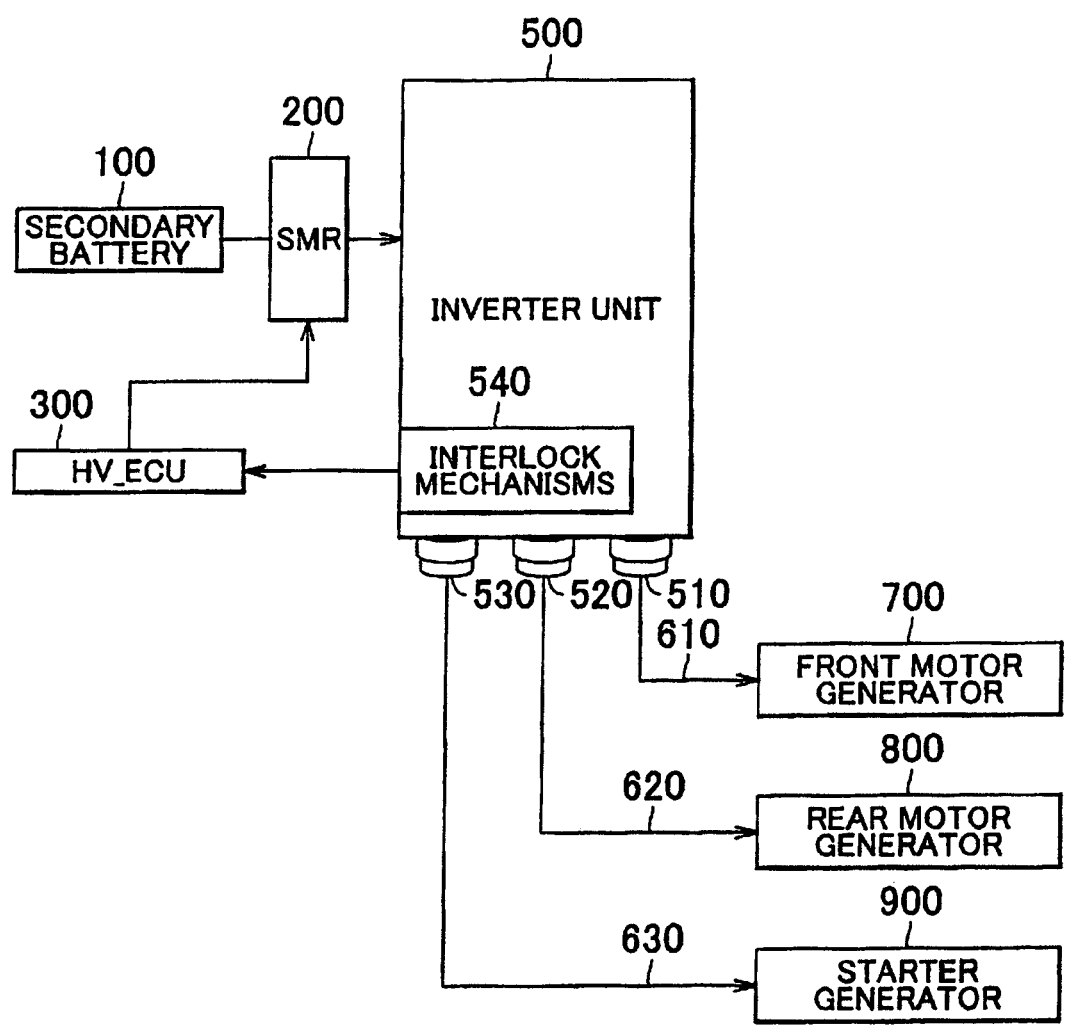
FIG. 1 is a view showing a vehicle power train including an inverter unit provided with connectors according to an embodiment of the invention.

Hereinafter, connectors in an embodiment of the invention will be described with reference to the drawings. It is to be noted that when the numbers, amounts, and the like are indicated in the following descriptions on the embodiment, the scope of the invention is not necessarily limited to the numbers, amounts, and the like, unless specified otherwise, and identical and corresponding parts, components, portions, and so on, will be denoted by the same reference numerals, and the same descriptions on them may not be repeated.

FIG. 1 illustrates an inverter unit including a high-voltage unit case provided with connectors in the embodiment of the invention and an inverter circuit disposed in the high-voltage unit case. The inverter circuit converts the direct current (DC) power supplied from a secondary battery provided in a vehicle into three-phase alternating current (AC) power and then supplies it to each motor generator that is a three-phase electric rotational device.

The connectors in the embodiment, which are high-voltage connectors, are provided at the input and output sides of the inverter unit. In the following descriptions, the high-voltage connectors at the output side of the inverter unit will be described. However, the invention is not limited to inverter circuits, and is not limited to output-side high-voltage connectors. In addition, although the connectors in the embodiment are provided in a hybrid vehicle, the invention is not limited to hybrid vehicles, that is, the connector according to the invention may be used in various vehicles including electric motor vehicles and fuel cell vehicles. Further, it is to be noted that "workers" in the following descriptions include, for example, users, such as vehicle drivers and occupants, and mechanics at maintenance factories, maintenance shops, and the like.

In the embodiment, the inverter unit is mounted in a hybrid vehicle including an engine and motors. The motors include drive motors that are provided at the front and rear sides of the vehicle, respectively, and operate on the power supplied from the secondary battery.

More specifically, referring to the block diagram of FIG. 1, the vehicle includes a secondary battery 100 that is a nickel-hydrogen battery, a lithium-ion battery, or the like, a front motor generator 700 that is a motor generator serving as an electric rotational device for driving the vehicle, a rear motor generator 800 that is also a motor generator serving as an electric rotational device for driving the vehicle, a starter generator 900 that serves as an electric rotational device for starting the engine, an inverter unit 500 that supplies power to the motor generators 700 and 800 and the starter generator 900, a system main relay (SMR) 200 that is provided between the secondary battery 100 and the inverter unit 500, and an HV-ECU (Electronic Control Unit) 300 that controls the system main relay 200 in cooperation with interlock mechanisms 540 of the inverter unit 500.

The front motor generator 700 is connected to a front wheel driveshaft of the vehicle and drives the front wheels using the power supplied from the secondary battery 100 via the inverter unit 500 or performs regenerative power generation by being driven by the front wheels. The rear motor generator 800 is connected to a rear wheel driveshaft of the vehicle and drives the rear wheels using the power supplied from the secondary battery 100 via the inverter unit 500 or performs regenerative power generation by being driven by the rear wheels. The power obtained through the regenerative power generation is used to charge the secondary battery 100.

The starter generator 900 functions as both a starter motor and an alternator. The starter generator 900 is used to start the engine during an intermittent operation of the engine and assist the power generation of the front motor generator 700.

The system main relay 200 interrupts the power supply to the inverter unit 500 from the secondary battery 100 based on a control signal from the HV-ECU 300. It is to be noted that a Power Control Unit (PCU) may be used in place of the inverter unit 500 in the embodiment, and in this case, a high-voltage unit, such as an inverter and converter, is disposed in the PCU.

The secondary battery 100, the inverter unit 500, the front motor generator 700, the rear motor generator 800, and the starter generator 900 are connected via three-phase power cables. The inverter unit 500 and the front motor generator 700 are connected to each other via a three-phase power cable 610 and a first connector 510 provided at the inverter unit 500.

The inverter unit 500 and the rear motor generator 800 are connected to each other via a three-phase power cable 620 and a second connector 520 provided at the inverter unit 500. The inverter unit 500 and the starter generator 900 are connected to each other via a three-phase power cable 630 and a third connector 530 provided at the inverter unit 500.

Thus, the three-phase power cables 610, 620, and 630 are connected to the inverter unit 500 via the first connector 510, the second connector 520, and the third connector 530, respectively.

Figure 2:
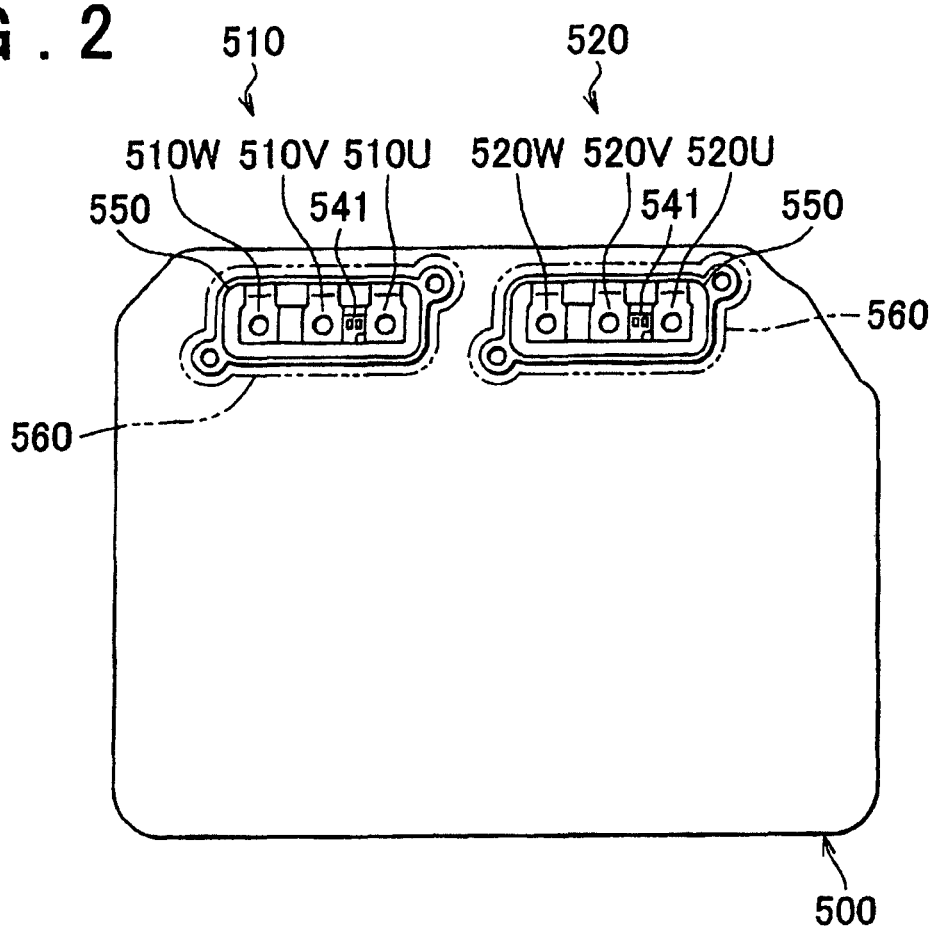
FIG. 2 is a view showing the structures of first and second connectors in the embodiment.
Figure 3A:
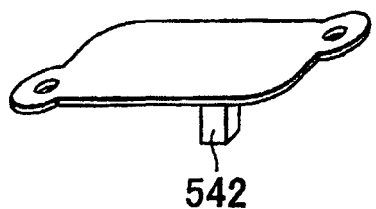
FIGS. 3A and 3B are views showing the structure of a protection cover for each of the first and second connectors in the embodiment, FIG. 3A being a perspective view, and FIG. 3B being a plan view.
Figure 3B:
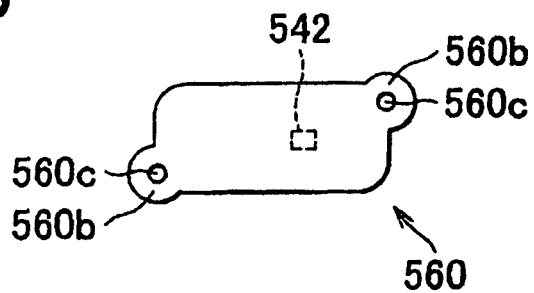
Figure 4:
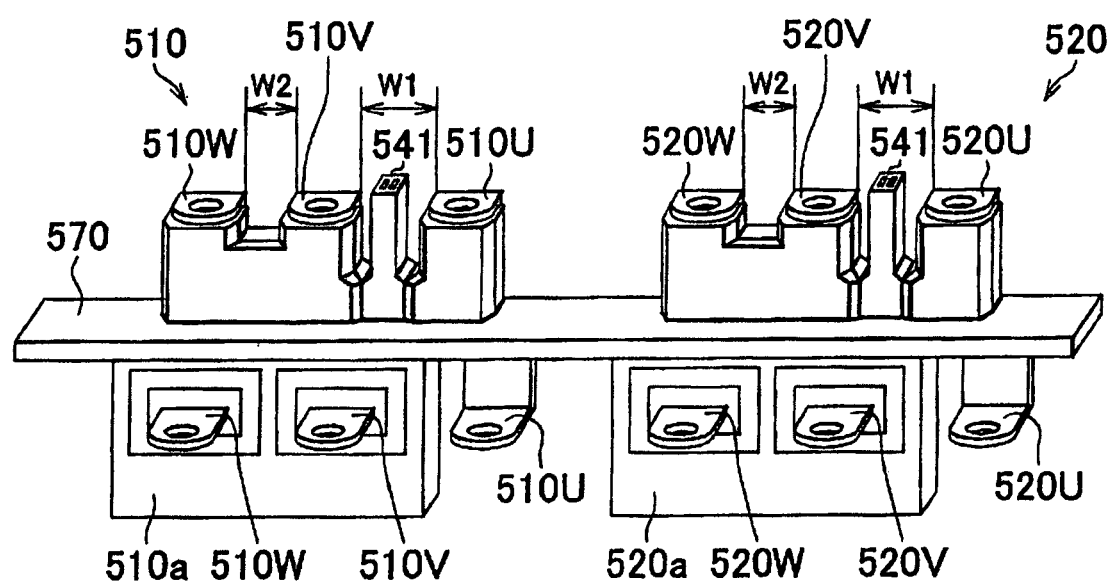
FIG. 4 is a view showing the internal structures of the first and second connectors in the embodiment.
Figure 5:
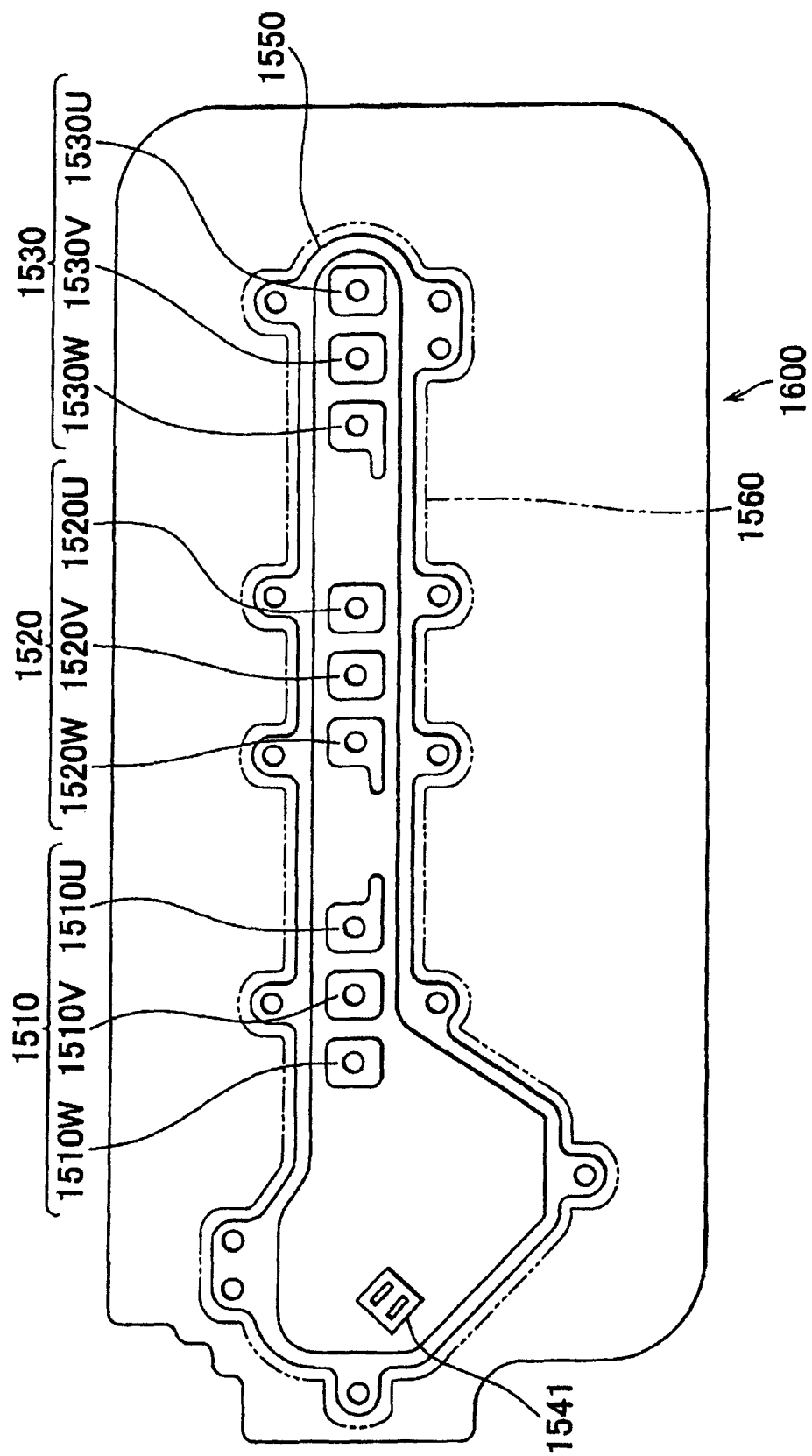
FIG. 5 is a view showing a connector structure in related art.

Next, the structures of the first connector 510 and the second connector 520 will be described in detail with reference to FIGS. 2 to 4. FIG. 2 is a plan view showing the structures of the first connector 510 and the second connector 520, and FIGS. 3A and 3B are views showing the structure of each protection cover, and FIG. 4 is a view showing the internal structures of the first connector 510 and the second connector 520. As shown in FIG. 2 and FIG. 4, the first connector 510 and the second connector 520 are disposed so as to be spaced apart from each other. It is to be noted that the structure of the third connector 530 is identical to those of the first connector 510 and the second connector 520, and therefore the structure of the third connector 530 will not be described.

First, the structure of the first connector 510 will be described in detail. Referring to FIG. 2, the first connector 510 includes a first connector terminal 510U to which a U-phase cable, which is a first electric cable, is to be connected, a second connector terminal 510V to which a V-phase cable, which is a second electric cable, is to be connected, and a third connector terminal 510W to which a W-phase cable, which is a third electric cable, is to be connected. The first connector terminal 510U and the second connector terminal 510V are disposed so as to be spaced apart from each other at a first predetermined interval (W1), and the second connector terminal 510V and the third connector terminal 510W are disposed so as to be spaced apart from each other at a second predetermined interval (W2). The first connector terminal 510U, the second connector terminal 510V, and the third connector terminal 510W are disposed in a row (refer to FIG. 4).

The first connector terminal 510U, the second connector terminal 510V, and the third connector terminal 510W are surrounded by a sidewall 550. That is, the first connector 510 includes the sidewall 550. Further, a protection cover 560 is attached to the sidewall 550 using fastening members, such as screws, so as to cover the first connector terminal 510U, the second connector terminal 510V, and the third connector terminal 510W. The protection cover 560 is detachable from the sidewall 550. That is, the first connector 510 includes the protection cover 560.

The first connector 510 includes the interlock mechanism 540. When the protection cover 560 is detached from the sidewall 550, the interlock mechanism 540 interrupts the currents flowing to the first connector terminal 510U, the second connector terminal 510V, and the third connector terminal 510W.

The interlock mechanism 540 includes an interlock connector 541 and an interlock pin 542. The currents are allowed to flow to the first connector terminal 510U, the second connector terminal 510V, and the third connector terminal 510W, by inserting the interlock pin 542 into the interlock connector 541. The interlock connector 541 is disposed between the first connector terminal 510U and the second connector terminal 510V.

Referring to FIGS. 2, 3A, and 3B, the protection cover 560 is formed in a substantially rectangular shape, and the protection cover 560 covers the opening defined by the sidewall 550. Ear portions 560b are provided, respectively, at two corner portions of the protection cover 560, which are diagonally opposed to each other, and attachment holes 560c are formed at the two corner portions, respectively. Further, the interlock pin 542 is attached to the reverse face of the protection cover 560 and positioned such that the interlock pin 542 is inserted into the interlock connector 541 when the protection cover 560 is attached to the sidewall 550.

Next, the structure of the second connector 520 will be described in detail. Referring again to FIG. 2, the second connector 520 includes a first connector terminal 520U to which a U-phase cable, which is a first electric cable, is to be connected, a second connector terminal 520V to which a V-phase cable, which is a second electric cable, is to be connected, and a third connector terminal 520W to which a W-phase cable, which is a third electric cable, is to be connected. The first connector terminal 520U and the second connector terminal 520V are disposed so as to be spaced apart from each other at the first predetermined interval (W1), and the second connector terminal 520V and the third connector terminal 520W are disposed so as to be spaced apart from each other at the second predetermined interval (W2). The first connector terminal 520U, the second connector terminal 520V, and the third connector terminal 520W are disposed in a row (refer to FIG. 4).

The first connector terminal 520U, the second connector terminal 520V, and the third connector terminal 520W are surrounded by the sidewall 550. That is, the second connector 520 includes the sidewall 550. Further, the protection cover 560 is attached to the sidewall 550 using fastening members, such as screws, so as to cover the first connector terminal 520U, the second connector terminal 520V, and the third connector terminal 520W. The protection cover 560 is detachable from the sidewall 550.

That is, the second connector 520 includes the protection cover 560. The shape of the protection cover 560 of the second connector 520 is the same as that of the protection cover 560 of the first connector 510.

Next, a first current sensor 510a provided at the first connector 510 and a second current sensor 520a provided at the second connector 520 will be described with reference to FIG. 4. The first connector 510 is disposed at a board 570, and the first current sensor 510a is attached to the second connector terminal 510V and the third connector terminal 510W. The current phases at the second connector terminal 510V and the third connector terminal 510W are "current detection phases". The first current sensor 510a is a two-phase current sensor. That is, the first field sensor 510a detects currents in two phases. The size of the first current sensor 510a and the insulation distance required between the second connector terminal 510V and the third connector terminal 510W are determined in advance. The second predetermined interval (W2) between the second connector terminal 510V and the third connector terminal 510W is determined based on the size of the first current sensor 510a and the required insulation distance.

The first current sensor 510a exerts no influence on the first predetermined interval (W1) between the first connector terminal 510U and the second connector terminal 510V. Thus, the interlock connector 541 is disposed between the first connector terminal 510U and the second connector terminal 510V. In this embodiment, the first predetermined interval (W1) is larger than the second predetermined interval (W2).

Likewise, the second connector 520 is also disposed at the board 570, and the second current sensor 520a is attached to the second connector terminal 520V and the third connector terminal 520W. The current phases at the second connector terminal 520V and the third connector terminal 520W are "current detection phases". The second current sensor 520a is a two-phase current sensor. That is, the second current sensor 520a detects currents in two phases. The size of the second current sensor 520a and the insulation distance required between the second connector terminal 520V and the third connector terminal 520W are determined in advance. The second predetermined interval (W2) between the second connector terminal 520V and the third connector terminal 520W is determined based on the size of the second current sensor 520a and the required insulation distance.

The second current sensor 520a exerts no influence on the first predetermined interval (W1) between the first connector terminal 520U and the second connector terminal 520V. Thus, the interlock connector 541 is disposed between the first connector terminal 520U and the second connector terminal 520V. In the embodiment, the first predetermined interval (W1) is larger than the second predetermined interval (W2). The parts present on the upper side of the board 570, as viewed in FIG. 4, are exposed from the surface of the inverter unit 500.

As described above, the second predetermined interval (W2) between the second connector terminal 510V and the third connector terminal 510W is determined based on the size of the first current sensor 510a and the required insulation distance. Likewise, the second predetermined interval (W2) between the second connector terminal 520V and the third connector terminal 520W is determined based on the size of the second current sensor 520a and the required insulation distance. If interlock mechanisms are provided between the second connector terminal 510V and the third connector terminal 510W and between the second connector terminal 520V and the third connector terminal 520W, respectively, it is impossible or difficult to use a single two-phase current sensor for each connector, that is, separate current sensors need to be provided at the second connector terminal 510V, the third connector terminal 510W, the second connector terminal 520V, and the third connector terminal 520W, respectively. This increases the second predetermined interval (W2) between the second connector terminal 510V and the third connector terminal 510W, and the second predetermined interval (W2) between the second connector terminal 520V and the third connector terminal 520W.

On the other hand, the first predetermined interval (W1) between the first connector terminal 510U and the second connector terminal 510V, and the first predetermined interval (W1) between the first connector terminal 520U and the second connector terminal 520V are not restricted by current sensors, and are set so that the respective required insulation distances are ensured. Thus, providing the interlock connectors 541 between the first connector terminal 510U and the second connector terminal 510V and between the first connector terminal 520U and the second connector terminal 520V, respectively, does not cause increases in the sizes of the first connector 510 and the second connector 520. The first predetermined interval (W1) between the first connector terminal 510U and the second connector terminal 510V in the first connector 510 may be different from the first predetermined interval (W1) between the first connector terminal 520U and the second connector terminal 520V in the second connector 520, and the second predetermined interval (W2) between the second connector terminal 510V and the third connector terminal 510W in the first connector terminal 510 may be different from the second predetermined interval (W2) between the second connector terminal 520V and the third connector terminal 520W in the second connector 520, as long as the first predetermined interval (W1) is larger than the second predetermined interval (W2).

According to the connector structure in the embodiment, it is possible to provide a connector that includes an interlock mechanism 540 but is compact in size.

Thus, the example embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A connector for connecting an inverter unit and an electric rotational device with each other, comprising:
   a first connector terminal to which a first electric cable is to be connected;
   a second connector terminal to which a second electric cable is to be connected, and which is disposed so as to be spaced apart from the first connector terminal;
   a third connector terminal which is disposed so as to be spaced apart from the second connector terminal, and to which a third electric cable is to be connected, wherein:
   a current sensor is connected to the second connector terminal and the third connector terminal,
   a first predetermined interval between the first connector terminal and the second connector terminal is larger than a second predetermined interval between the second connector terminal and the third connector terminal, and
   the first connector terminal is a U-phase terminal, the second connector terminal is a V-phase terminal, and the third connector terminal is a W-phase terminal;
   a sidewall that surrounds the first connector terminal, the second connector terminal, and the third connector terminal;
   a protection cover that is attached to the sidewall so as to cover the first connector terminal, the second connector terminal, and the third connector terminal, and is detachable from the sidewall; and
   an interlock mechanism that interrupts currents flowing to the first connector terminal, the second connector terminal, and the third connector terminal when the protection cover is detached from the sidewall, wherein
   the interlock mechanism includes an interlock connector and an interlock pin, and the currents are allowed to flow to the first connector terminal, the second connector terminal, and the third connector terminal, by inserting the interlock pin into the interlock connector; and
   the interlock connector is disposed between the first connector terminal and the second connector terminal, and the interlock pin is provided at the protection cover and is positioned such that the interlock pin is inserted into the interlock connector when the protection cover is attached to the sidewall.

2. The connector according to claim 1, wherein the first connector terminal, the second connector terminal, and the third connector terminal are disposed in a row.

3. The connector according to claim 1, wherein a plurality of the connectors are disposed so as to be spaced apart from each other.

4. A vehicle comprising:
   an inverter unit;
   an electric rotational device; and
   the connector according to claim 1, wherein
   the connector connects the inverter unit and the electric rotational device with each other.

5. A vehicle comprising:
   an inverter unit;
   a plurality of electric rotational devices; and
   a plurality of the connectors according to claim 1, wherein
   each of the connectors connects a corresponding one of the electric rotational devices and the inverter unit with each other.

* * * * *